United States Patent [19]

Okada et al.

[11] Patent Number: 4,748,812

[45] Date of Patent: Jun. 7, 1988

[54] TURBO COMPOUND ENGINE

[75] Inventors: Masaki Okada; Shigeo Sekiyama, both of Kawasaki, Japan

[73] Assignee: Isuzu Motors Limited, Tokyo, Japan

[21] Appl. No.: 91,161

[22] Filed: Aug. 31, 1987

[30] Foreign Application Priority Data

Aug. 29, 1986 [JP] Japan .................... 51-201480
Sep. 29, 1986 [JP] Japan .................... 51-228107

[51] Int. Cl.$^4$ ............................. F02G 5/00
[52] U.S. Cl. ............................. 60/614; 60/624
[58] Field of Search ................... 60/602, 614, 624

[56] References Cited

U.S. PATENT DOCUMENTS 2,375,852  5/1945  Kilchenmann ............... 60/624 X
4,224,794  9/1980  Woollenweber ............... 60/602

FOREIGN PATENT DOCUMENTS 962764   4/1957  Fed. Rep. of Germany ....... 60/624
56341   12/1983  Japan ...................... 60/624
61-921   3/1986  Japan ...................... 60/624

Primary Examiner—Michael Koczo
Attorney, Agent, or Firm—Cullen, Sloman, Cantor, Grauer, Scott & Rutherford

[57] ABSTRACT

A turbo compound engine including driving force transmitting means for connecting the crankshaft of an engine, and a power turbine disposed in an engine exhaust passage achieves adequate engine brake force by applying a resistance force against the crankshaft directly or indirectly during the exhaust brake because the engine brake force of the turbocharged engine suffers a relative decrease due to the increase in the output power.

9 Claims, 6 Drawing Sheets

TURBO COMPOUND ENGINE

BACKGROUND OF INVENTION

1. Technical Field

The present invention relates to a turbo compound engine in the form of a highly supercharged engine that is equipped with either a turbocharger or a supercharger (referred to as "turbocharger" hereinafter) and a power turbine. In particular, it concerns a turbo compound engine that is capable of developing an engine brake force that is at least equal to that of a non-supercharged engine of equal power output.

2. Background Art

Generally, supercharged engines feature in comparison with non-supercharged engines of larger displacements: (1) better fuel economy, (2) output performance that is at least equal to non-supercharged engines, and (3) lighter weight and compactness of the engine.

These advantages of supercharged engines are further augmented in the highly supercharged engines and in turbo compound engines, and this invention is especially concerned with the latter.

In the turbo compound engine, as shown in FIG. 11 of the accompanying drawings, the energy of exhaust gas from the engine b is recovered by the turbocharger c as its supercharging work, and the remaining energy of the exhaust is recovered by the power turbine d as its power work. Although this construction brings about a general improvement in the power output performance, fuel economy, and gain of the engine b, the expansion ratios of the turbocharger c and the power turbine d must be increased in order to further improve the turbo compound engine's overall performance. Specifically, raising of supercharging pressure mandates an increase in the effectiveness of a turbo compound engine.

A typical prior art engine of the type mentioned above is disclosed in Japanese Utility Model Laid Open No. 157,941/85. In this engine, there is connected, as shown in FIG. 12 of the accompanying drawings, to the exhaust passage e that connects the turbocharger $c_1$ and the power turbine $d_1$, a bypass f that bypasses the power turbine $d_1$, and there is disposed in the junction g of exhaust passage e and bypass f a switching valve h, which functions to throttle off the exhaust passage e in proportion to the depression of the accelerator pedal (not shown) of the engine.

It is an object of the present invention to reduce diminishment of power output performance when the energy of exhaust is low caused by the back pressure acting on the turbine of the turbocharger $c_1$ by letting the exhaust bypass through the bypass f.

The magnitude of the flow rate of exhaust, and hence the energy thereof, is sensed in terms of the magnitude of depression of the accelerator pedal. A problem exists in using this type of internal combustion engine in a vehicle, in that obtaining an engine brake (exhaust brake) force commensurate with increased power output is difficult. This may be seen in the relationships existing among engine revolution speed, engine output power Pme (solid lines), and engine brake force Pmf (broken lines), shown in FIG. 13 for a highly turbocharged engine in comparison with a non-supercharged engine. Specifically, with regard to the relative braking force (i.e., engine revolution speed/engine output power) at the 100% rated revolution speed $N_{100}$, $B_N/S_N > B_T/S_T$, where B stands for the engine brake force, S the engine output power, the subscript N stands for a non-supercharged engine, and T stands for a turbocharged engine. This means that the relative engine brake force suffers a decrease when the supercharging is intensified.

To reiterate, obtaining a sufficiently large engine brake force is important not only for the maneuverability and safety of the vehicle, but also for taking better advantage of the advantages of the turbo compound engine.

SUMMARY OF THE INVENTION

This invention solves the aforementioned problems by means of a turbo compound engine, comprising a power turbine that is disposed in the exhaust passage of the engine so as to recover the energy of the exhaust gas, a driving power transmission means that connects the power turbine and engine's crankshaft so as to transmit the driving power, a fluid passage that is connected to that part of the exhaust passage which lies between the power turbine and the engine, and passage switching means that closes, upon application of an exhaust brake, the exhaust passage upstream of the aforesaid fluid passage while simultaneously opening the fluid passage.

In normal operation, the power turbine recovers energy of the gas exhausted out of the engine, and this recovered energy is transmitted to the crankshaft via driving power transmission means as a part of the driving energy of the engine.

When the exhaust brake is operating, however, the upstream side of the fluid passage is closed by fluid passage switching means, and, at the same time, the exhaust passage immediately upstream of the power turbine is connected to the fluid passage. This causes the power turbine, which is ordinarily meant to operate so as to recover energy, to function as a compressor to take in the air from the fluid passage, and as a result, the power turbine performs negative work, namely, the work of pump. Therefore, upon application of an exhaust brake, a large engine brake force is generated as the motor friction of the engine, the pumping, or the negative work, and the exhaust braking forces become additive.

DESCRIPTION OF THE PREFERRED EMBODIMENTS

Figure 1:
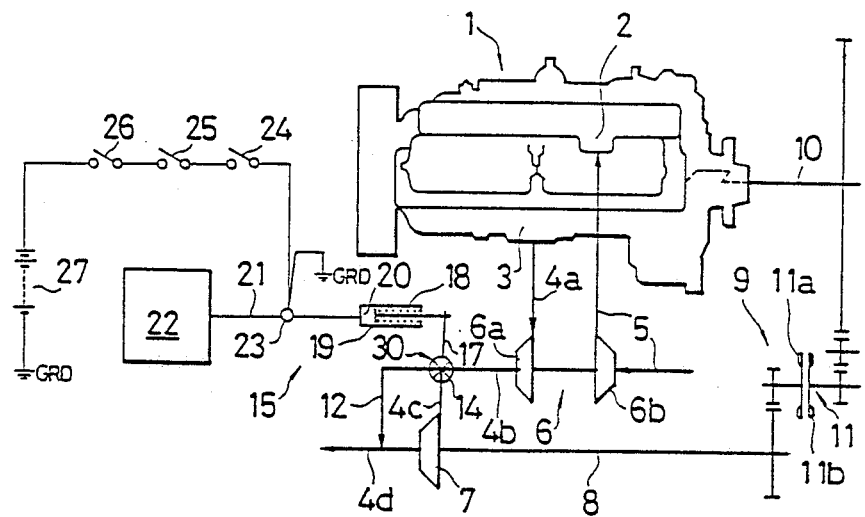
FIG. 1 is a system diagram, showing a first embodiment of the turbo compound engine of the present invention.

A first embodiment of the turbo compound engine according to the present invention will first be described with reference to the attached drawings. In FIG. 1, the numeral 1 designates an engine, 2 designates the intake manifold, and 3 designates the exhaust manifold. To the exhaust manifold 3, there is connected an exhaust passage 4 comprising exhaust passages 4a, 4b, 4c, and 4d, while the intake manifold 2 is connected to an intake passage 5.

In the exhaust passage 4 there is disposed the turbine 6a of the turbocharger 6 at an intermediate point in exhaust passage 4a, while the compressor 6b of the turbocharger 6 is disposed an intermediate point in the intake passage 5. In the exhaust passage 4c downstream of the turbocharger 6, there is disposed a power turbine 7. In this embodiment, the output shaft 8 of the power turbine 7 is connected to the crankshaft 10 of the engine 1 via plural gear trains 9, one of which includes a fluid coupling (fluid clutch) 11.

The fluid coupling 11 is constructed so as to permit hydraulic oil to move freely between the input side (power turbine side) of pump wheel 11a and the output side (crankshaft side) of pump wheel 11b, and also so as to supply hydraulic oil to either one of the pump wheels 11a or 11b when the other is operating so that the rotational power may be transmitted effectively.

The turbo compound engine of this invention is intended to achieve an engine brake force which corresponds to the power output of the engine 1. For this purpose, a resistance opposing the rotation of the crankshaft 10 either directly or indirectly so as to make the crankshaft 10 perform a large amount of negative work, would be effective. This is realized in the turbo compound engine of the present invention by making the power turbine 7, which is connected to the crankshaft 10 via gear trains 9, perform a large amount of negative work. In other words, the turbo compound engine 7 of this invention is constructed so that augmentation of negative work in the exhaust braking is achieved by operating the power turbine 7 as if it were a compressor of poor efficiency.

Figure 2:
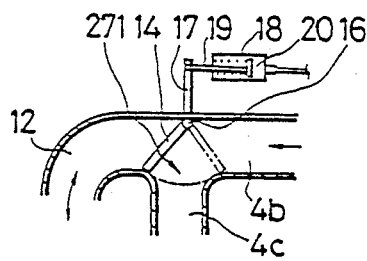
FIG. 2 is an enlarged view of a portion of FIG. 1, showing the deposition of the fluid passage switching valve at the junction of the exhaust passage and the fluid passage.

As shown in FIG. 2, to the junction 271 of exhaust passage's 4b downstream end and exhaust passage 4c, one end of the fluid passage 12 is connected, and in the junction 271, there is disposed a fluid passage switching means 30 which functions to conduct switching of fluid paths in the junction 271, the fluid passage switching means 30 comprising a switching valve 14 and its driving mechanism 15. The switching valve 14 is swingably positioned within the exhaust passage 4b, so as to connect the exhaust passage 4c, which is located immediately upstream toward the power turbine 7, to the fluid passage 12, while at the same time closing the exhaust passage 4b which lies upstream from the end of the fluid passage 12.

The driving mechanism 15 is constructed as follows. As shown in FIG. 2, to the rotation support 16 of the switching valve 14, there is integrally connected a lever member 17, and to the free end of this lever member 17, there is connected an actuating rod 19 of the actuator 18, in a manner such that when the actuating rod 19 is extended by the actuator 18, the switching valve 14 is moved to a position closing the exhaust passage 4b.

The actuator 18 has a fluid chamber 20 connected, via fluid feeding passage 21, to a fluid feeding apparatus 22. Within the fluid feeding passage 21, there is disposed an electromagnetic valve 23 which opens the fluid feeding passage 21 to the fluid chamber 20 when activated by electric current. Furthermore, the electromagnetic valve 23 is arranged so as to receive electric power only when the neutrality sensing switch 24, which senses neutrality of the engine 1, the clutch action switch 25, and the exhaust brake switch 26 are all turned ON. The number 27 designates a DC power source such as a battery.

Turning now to a description of the operation of the turbo compound engine of this invention in connection with FIG. 1, when the exhaust brake switch 26 is turned OFF, the exhaust from the engine 1 is fed to the exhaust passage 4 via the exhaust manifold 3. The turbine 6a of the turbocharger 6 recovers gas energy to drive the coaxially disposed compressor 6b, and thereby feeds supercharging air into the cylinders of engine 1. In the meantime, the exhaust leaving the turbocharger turbine 6a gives rotational driving power to the power turbine 7, resulting in the energy of the exhaust gas being again recovered by the power turbine 7, the recovered energy being delivered to the crankshaft 10 as an additional part of its rotation energy via the gear trains 9 and the fluid coupling 11.

When the exhaust brake is operating, on the other hand, the neutrality sensing switch 24, the clutch action switch 25, and the exhaust brake switch 26 are all turned ON, whereby the electromagnetic valve 23 is also turned ON to admit working fluid into the fluid chamber 20 of the actuator 18 from the fluid feeding apparatus 22. The actuating rod 19 acts on the switching valve 14 through the lever member 17 so as to close off the exhaust passage 4b and to connect the exhaust pasage 4c, which lies downstream of switch valve 14, to the fluid passage 12.

Figure 3:
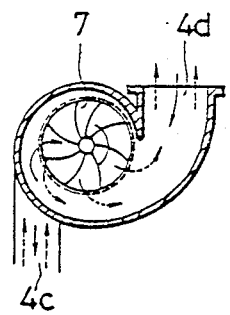
FIG. 3 is an enlarged view of another portion of FIG. 1, showing the directions of air flow upon connecting the fluid passage and the exhaust passage by means of the fluid passage switching valve, and, at the same time, fully closing the upstream part of the exhaust passage.

Since the power turbine 7 in this state of operation is deprived of the rotation energy coming from the exhaust gas, the rotation force of the crankshaft is imposed on the power turbine 7 via the gear trains 9 and the fluid coupling 11 in contrast to the state of normal operation; thus the power turbine 7 is made to operate, as shown in FIG. 3, as a compressor of poor efficiency to blow air out of the fluid passage 12 toward downstream through exhaust passages 4c and 4d. Because this work of the power turbine of stirring up the air means large negative work for the crankshaft 10, a large engine brake force is thereby generated together with the motor friction.

Here, the exhaust brake itself is constituted by the exhaust manifold 3 and an exhaust brake valve (not shown) that is disposed downstream, and when this exhaust brake valve is fully closed, the exhaust resistance, namely the pumping work, is increased, thereby creating the engine brake force.

Figure 4:
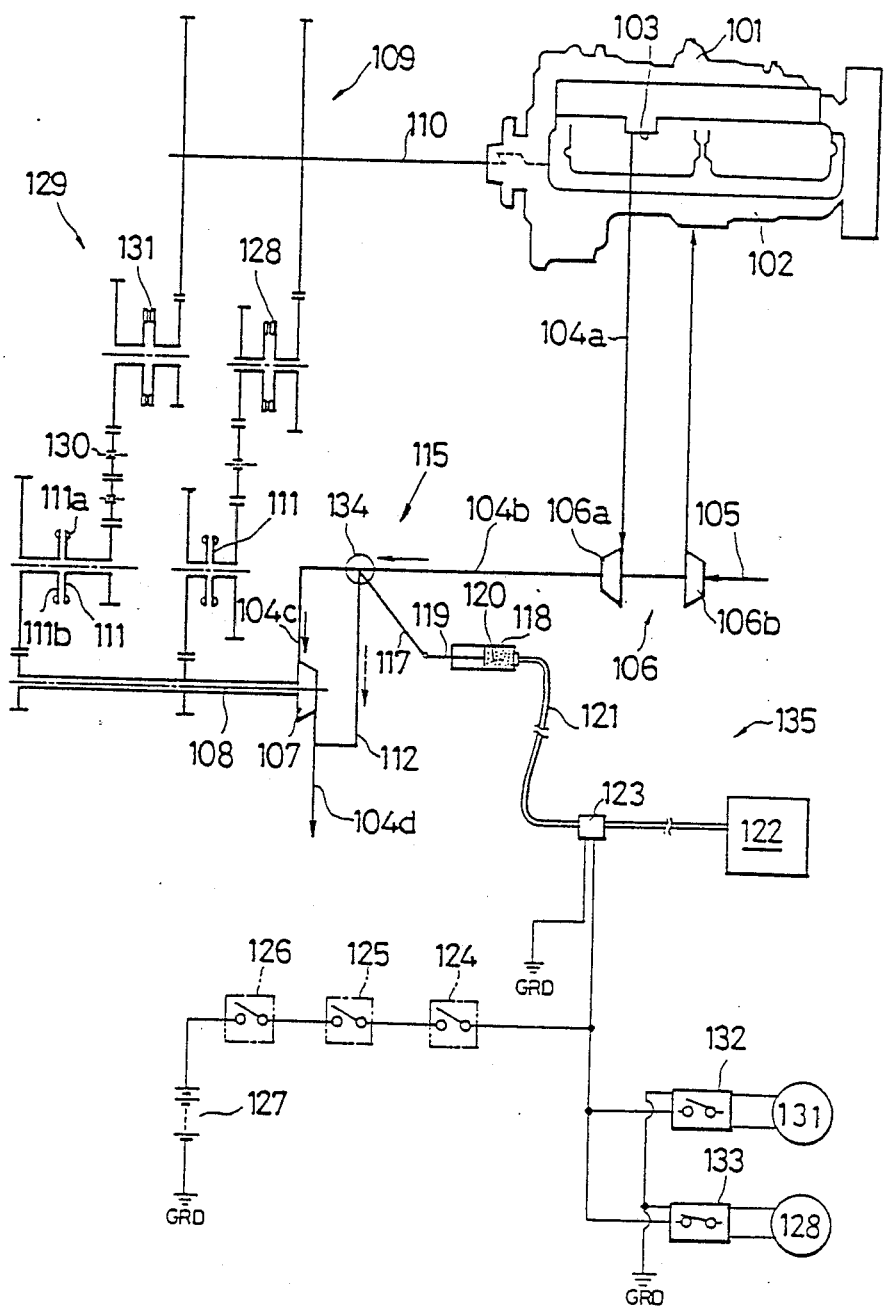
FIG. 4 is a system diagram, depicting a second embodiment of the turbo compound engine of the present invention.

A second embodiment of the turbo compound engine of this invention is depicted in FIG. 4. The numeral 101 represents the engine, 102 depicts the intake manifold, and 103 designates the exhaust manifold, to which there is connected an exhaust passage 104, comprising exhaust passages 104a, 104b, 104c, and 104d, while to the intake manifold 102, there is connected an intake passage 105.

The turbine 106a of the turbocharger 106 is disposed intermediate the ends of the exhaust passage 104a, while the compressor 106b of the turbocharger 106 is disposed in the intake passage 105. In the exhaust passage 104b downstream from the turbocharger 106, on the other hand, there is disposed a power turbine 107 to recover the exhaust gas energy.

In this embodiment, the objective of securing sufficient engine brake force in accordance with the power output is achieved by making the power turbine 107 rotate in the reverse direction upon application of exhaust brake, so that the power turbine 107 performs large negative work.

The construction features which cause reversal of power turbine's 107 operating mode from normal operation, will now be described again with reference to FIG. 4. The output shaft 108 of the power turbine 107 is connected to the crankshaft 110 of the engine 101 via a plurality of normal rotation gear trains 109, and to the power turbine 107 side train thereof, there disposed is a fluid couping 111, while between the gear train containing the fluid coupling 111 and the crankshaft 110 side of gear train, there is disposed a normal rotation electromagnetic clutch 128 in such a way that when the normal rotation electromagnetic clutch 128 is engaged, rotation is transmitted from the power turbine 107 to the crankshaft 110.

At the same time, the output shaft 108 of the power turbine 107 is connected to the crankshaft 110 also via the reversing gear trains 129, which are disposed in parallel to normal rotation gear trains 109, the reversing gear trains 129 being equipped with a reverse idling gear 130. Between the reverse idling gear 130 and the crankshaft 110 side gear trains, there is disposed a reversing electromagnetic clutch 131 in such a way that when the reversing electromagnetic clutch 131 is engaged, rotation is transmitted from the crankshaft 110 to the power turbine 107. Here, the system is designed so that the reversing electromagnetic clutch 131 is disengaged whenever the normal rotation electromagnetic clutch 138 is engaged and vice versa, with the result that when one set of gear trains is connected, the other set is disconnected.

To each set of the power turbine 107 side of the gear trains respectively of the normal rotation gear trains 109 and the reversing gear train 129, there disposed is a fluid coupling 111 which is constructed so as to permit the hydraulic oil to move freely between the input side (power turbine side) pump wheel 111a and the output side (crankshaft side) pump wheel 111b, and further so as to feed the hydraulic oil to either one of the pump wheels 111a and 111b whenever the other is operating, and so as to transmit the rotation power.

Here, the duty of the power turbine's 107 impeller, which is designed to perform the task with high efficiency, it is to develop, when reversed, a large resistance for the crankshaft 110. For this purpose, the following construction has been devised in this embodiment.

Namely, as shown in FIG. 4, to that part of the exhaust passage 104b which lies between the power turbine 107 and the turbocharger 106, there is connected one end of a fluid passage 112 by one end, the other end thereby being connected to that part of the exhaust passage 104b, the conjunction of the two being on downstream side with regard to the power turbine 107. To the fluid passage 112 and 104b, there is disposed a fluid passage switching means 115 at a junction upstream of the power turbine 107.

Figure 5:
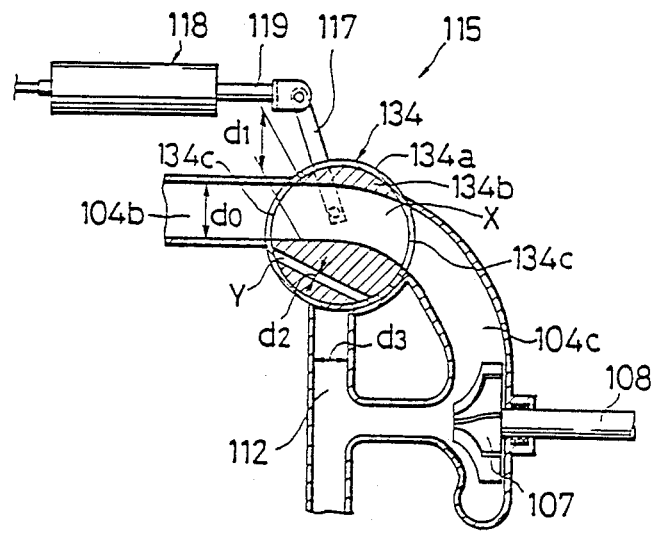
FIG. 5 is an enlarged view of a portion of FIG. 4, showing the switching positions of the rotary valve in normal operation, the rotary valve having a first port of large fluid passage area and a second port of small fluid passage area and being disposed at the junction of the fluid passage and the exhaust passage.
Figure 6:
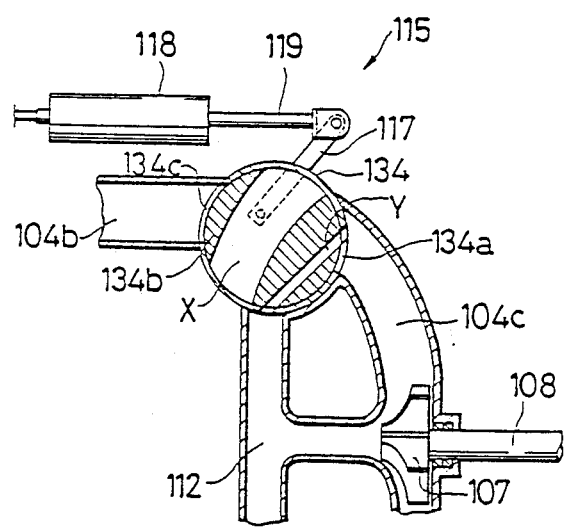
FIG. 6 is an enlarged view of a portion of FIG. 4, showing the switching position of the rotary valve when the exhaust brake is operating.

In this embodiment, the fluid passage switching means 115 comprises, as shown in FIGS. 4 and 5, a rotary valve 134, which is disposed in the above mentioned junction, and a driving mechanism 135 therefor. The rotary valve 134 comprises, as shown in FIGS. 5 and 6, a rotor 134b, which is rotatably disposed in the casing 134a, a first port X, and a second port Y, the two ports being formed in the rotor 134b so that the diameter of the first port X, $d_1$, is equal to that of the exhaust passage 104b, $d_0$, while the diameter of the second port Y, $d_2$, smaller than that of the fluid passage 112, $d_3$. To the casing 134a, furthermore, an opening 134c is provided for each of the exhaust passages 104b, 104c, and the fluid passage 112, in a way such that when the first port X is rotated into a position connecting the exhaust passages 104b and 104c, the second port Y will be rotated away to disconnect the exhaust passage 104b and the fluid passage 112 (FIG. 5), and vice versa (FIG. 6).

The driving mechanism 135 that drives and controls the rotary valve 134 is constucted as follows. Namely, as shown in FIGS. 4 and 5, to the rotor 134b there is connected one end of a lever member 117, while to the other free end thereof, namely that end which extends out of the exhaust passage 104b in the radial direction, there is connected the actuating rod 119 of the actuator 118.

Now, referring to FIG. 4, the fluid chamber 120 of the actuator 118 is connected to a fluid feeding apparatus 122 via a fluid feeding passage 121, and midway in the fluid feeding passage 121, there is disposed an electromagnetic valve 123 in a manner such that it connects the fluid chamber 120 and the fluid feeding apparatus 122 when activated by electric current from a DC power source 127, such as a battery. It is to be noted that the electromagnetic valve 123 is activated only when the neutrality sensing switch 124 that senses neutrality of engine 101, the clutch action switch 125, and the exhaust brake switch 126 are all turned ON.

The numeral 133 denotes a switch for the normal rotation electromagnetic clutch 128, whose contact point is kept closed during normal operation, and 132 denotes a similar switch for the reversing electromagnetic clutch 131, which during normal operation, is kept open.

Turning now to a description of the operation of the turbo compound engine of this invention and referring to the accompanying drawings, and first FIG. 4, since the electromagnetic valve 123 is turned OFF when the exhaust brake switch 126 is turned OFF, the exhaust passage 140c immediately upstream of the power turbine 107 and the exhaust passage 104b upstream of the rotary valve 134 are mutually connected via the first port X as shown in FIG. 5. In this state, the exhaust gas is fed from the engine 101 through the exhaust manifold 103 to the exhaust passage 104b, where the turbocharger's 106 turbine 106a recovers the energy of the exhaust gas while driving the coaxially disposed compressor 106b, which feeds supercharging air into the cylinders of engine 101. In the meantime, the exhaust gas leaving the turbocharger's 106 turbine 106a gives rotational driving power to the power turbine 107, whereby the exhaust gas energy is recovered by the power turbine 107.

It is to be noted here that, since the switch for the normal rotation electromagnetic clutch 133 is ON, while the switch for the reversing electromagnetic clutch 132 is OFF, the exhaust gas energy recovered by the power turbine 107 is transmitted to the crankshaft 110 via the normal rotation gear trains 109, to be used as a part of the rotation energy.

When the exhaust brake is operating, on the other hand, the neutrality sensing switch 124, the clutch action switch 125, and the exhaust brake switch 126 are all turned ON, whereby the switch for the reversing electromagnetic clutch 132 is turned ON while the switch for the normal rotation electromagnetic clutch 133 is turned OFF, and the electromagnetic switch 123 is turned ON, allowing the fluid feeding apparatus 122 to feed the working fluid into the action chamber 120 of the actuator 118, which drives the action rod 119 to act on the rotary valve 134 via the lever member 117 so as to close the exhaust passage 104b, while connecting the exhaust passage 104c that lies downstream of the rotary valve 134 and the fluid passage 112 via the second port Y.

Figure 7:
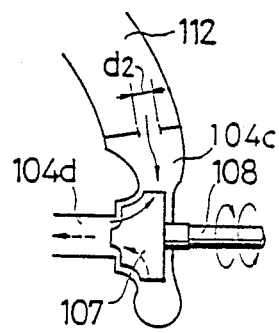
FIG. 7 is a cross sectional view, showing the directions either of air or of exhaust with the power turbine operating normally or in reverse.

In this state, therefore, the power turbine 107 is deprived of the rotation driving power of the exhaust gas, whereby the rotation power of the crankshaft 110 is transmitted, in contrast to the case of normal rotation, to the power turbine 107 via the reversing gear trains 129. Namely, the power turbine 107 is now operating reversed, as shown in FIG. 7, as a compressor of poor efficiency, blowing air out of the exhaust passage 104d downstream thereto into the junction side of the fluid passage 112. Since the gas flowing toward the fluid passage 112 through the second port Y is accelerated due to the throttling action of the second port Y, a large amount of negative work in the form of the air stirring work and the air compressing work of the power turbine 107 is forced against the crankshaft 110.

Thus, when the exhaust brake is operating, a large engine brake force is created on above mentioned negative work together with the negative work of the exhaust brake and the motor friction. The exhaust brake has an exhaust brake valve (not shown) that is disposed in the exhaust passage 104a, such that increase in the exhaust resistance brought about when this brake valve is fully closed, namely an increase in the pumping work, acts as the engine brake force.

Figure 8:
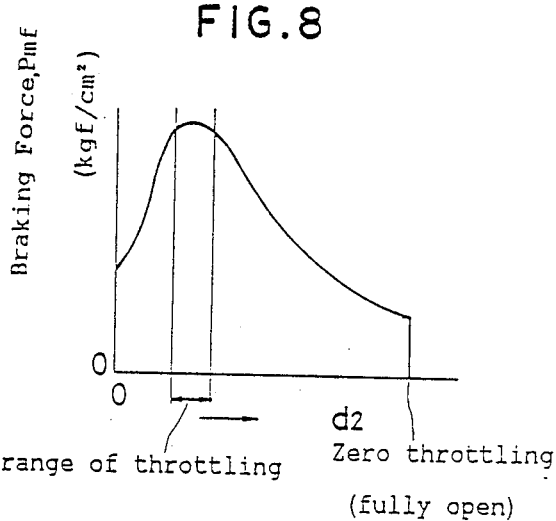
FIG. 8 is an engine brake force diagram, showing the affects of changing the diameter of the port.

It is to be noted here that a relationship exists between the diameter of the second port Y, $d_2$, and the engine brake force Pmf, or the amount of the negative work, as illustrated in FIG. 8, although the diameter $d_2$ depends much on the form of the power turbine 107. Specifically, as seen in FIG. 8, there is an optimum range for the diameter $d_2$ in which the power turbine 107 will give rise to maximum engine brake force (see also FIG. 10).

As described above, in the turbo compound engine of this invention, a large exhaust brake force can be generated by making the power turbine 7 or 107 perform negative work; in the first embodiment by letting the power turbine 7 rotate in the normal rotation direction, and in the second embodiment by letting the power turbine 107 rotate in the reverse direction. The advantages obtainable by this construction in the engine brake force over that of the base engine is shown in FIG. 10, which is an engine brake force performance diagram.

Figure 9:
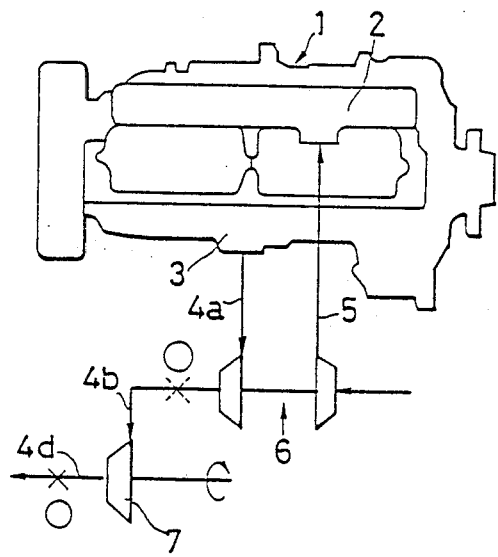
FIG. 9 is a schematic diagram, illustrating a turbo compound engine equipped with a turbocharger and a power turbine.
Figure 10:
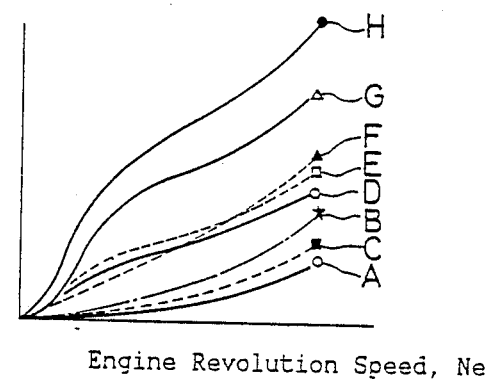
FIG. 10 is an engine brake force diagram, showing the affects of engine revolution speed for a turbo compound engine, a base engine, and the two turbo compound engines according to the first and the second embodiments respectively the present invention.
Figure 11:
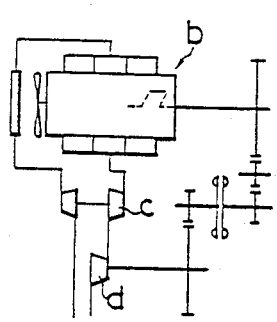
FIG. 11 is a system diagram, illustrating a conventional turbo compound engine equipped with a turbocharger and a power turbine.
Figure 12:
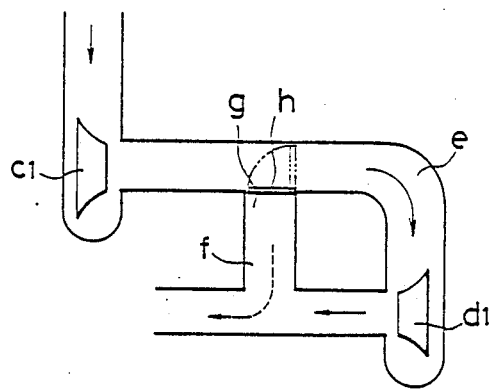
FIG. 12 is a system diagram, illustrating a by-pass passage connected by a switching valve between the turbocharger's turbine and the power turbine for the purpose of controlling the rotation performance of the turbocharger in a conventional turbocharged internal combustion engine.
Figure 13:
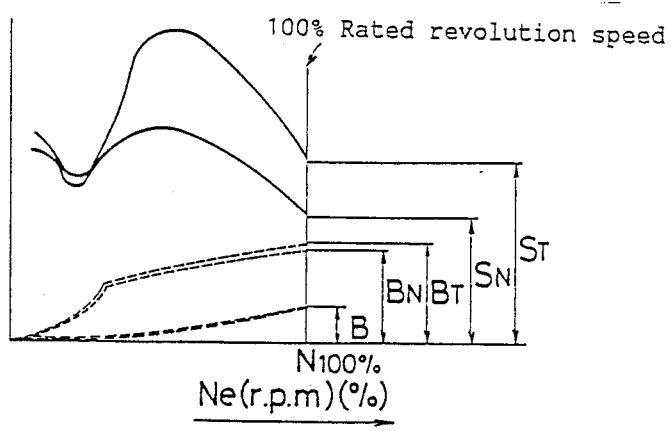
FIG. 13 depicts performance curves, showing the relationship between engine output and revolution speed, and the relationship between engine brake force and revolution speed for a nonturbocharged engine and a highly supercharged engine.

In FIG. 10, the curve denoted A stands for the motor friction of the base engine, B for that of the turbo compound engine, C for the engine brake force performance of that turbo compound engine which has been illustrated in FIG. 9 in the case of when either the passage between the turbocharger 6 and the power turbine 7 is closed or the exhaust passage 4d downstream of the power turbine 7 is closed, D for that of the base engine with the exhaust brake operating, and E for that of the turbo compound engine with the exhaust brake operating.

It will be seen that case E is favored in engine brake force performance, yet the force is not large enough for a turbo compound engine having high power output capability. For this, case F, where the exhaust passage 4 that lies between the turbocharger 6 and the power turbine 7 is closed, and, at the same time, the power turbine 7 is made to perform the air stirring work rotating in the normal direction, shows an improvement over the case E.

This means that case G, which is the first embodiment of this invention wherein the power turbine 7 is made to perform the compression work rotating in the normal direction, is capable of giving an even better engine brake performance, and furthermore that the case H, which is the second embodiment of this invention wherein the power turbine 107 is made to perform the negative work rotating in reverse, is capable of giving not only yet better engine brake performance but an even quicker response (namely, the steeper rise in the initial state), leading to better reliability in the engine brake, than case G.

Finally, in the first and the second embodiments, the fluid passages 12 and 112 may be formed pre-throttled to a desired aperture in accordance with the power output performance of the engine 1 and 101, with the exhaust passages upstream of the fluid passage 12 and 112 opened or closed as demanded by the application, respectively.

We claim:
1. A turbo compound engine comprising:
an engine having an exhaust gas passage and a crankshaft;
a power turbine disposed in said exhaust gas passage so as to recover the exhaust gas energy;
driving power transmission means for drivingly connecting said power turbine and said crankshaft so as to transmit said driving power;

a fluid passage connected to a portion of said exhaust passage which lies between said power turbine and said engine; and fluid passage switching means for closing said exhaust passage upstream of said fluid passage while opening said fluid passage during exhaust braking.

2. The turbo compound engine according to claim 1, wherein said driving power transmission means includes gear train means for connecting said crankshaft and said power turbine.

3. The turbo compound engine according to claim 2, wherein said gear train means includes a plurality of gear trains and fluid clutches.

4. The turbo compound engine according to claim 1, wherein one end of said fluid passage is connected to said exhaust passage upstream of said power turbine, and the other end of said fluid passage is connected to the exhaust passage downstream of said power turbine.

5. A turbo compound engine comprising:

an engine having an exhaust gas passage and a crankshaft;

a power turbine disposed in said exhaust passage so as to recover the exhaust gas energy;

driving power transmission means for drivingly connecting said power turbine and said crankshaft of said engine so as to transmit said driving power;

a fluid passage connected to a portion of said exhaust passage which lies between said power turbine and said engine; and fluid passage switching means for closing the upstream side of said exhaust passage relative to said fluid passage and for opening said fluid passage to a predetermined aperture during engine exhaust braking conditions.

6. The turbo compound engine according to claim 5, wherein said driving power transmission means includes reversing gear trains that transmit said driving power from said crankshaft to said power turbine during said exhaust braking conditions and normal rotation gear trains that transmit said driving power from said power turbine to said crankshaft during normal engine operating conditions.

7. The turbo compound engine according to claim 6, wherein said normal rotation gear trains and said reversing gear trains respectively include fluid clutches and electromagnetic clutches.

8. The turbo compound engine according to claim 5, wherein said fluid passage switching means includes a switching valve that closes said exhaust passage upstream of said fluid passage while opening said fluid passage to said predetermined aperture when during exhaust braking conditions and the driving power is transmitted from said crankshaft to said power turbine, said fluid passage switching means further including a driving mechanism for driving said switching valve.

9. The turbo compound engine according to claim 8, wherein said switching valve includes a rotary valve having a first port whose diameter is essentially equal to that of said exhaust passage, and a second port whose diameter is essentially smaller than that of said fluid passage, said switching valve being arranged to be activated by said driving mechanism so as to connect said second port to said fluid passage, thereby disconnecting said first port from said exhaust passage when the exhaust braking conditions and driving power is being transmitted from said crankshaft to said power turbine.

* * * * *